US012437728B2

(12) United States Patent
Liu

(10) Patent No.: US 12,437,728 B2
(45) Date of Patent: Oct. 7, 2025

(54) BACKLIGHT PROCESSING METHOD AND DEVICE OF DISPLAY SCREEN, STORAGE MEDIUM AND ELECTRONIC DEVICE

(71) Applicant: TCL CHINA STAR OPTOELECTRONICS TECHNOLOGY CO., LTD., Guangdong (CN)

(72) Inventor: Hualong Liu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/615,072

(22) PCT Filed: Oct. 29, 2021

(86) PCT No.: PCT/CN2021/127542
§ 371 (c)(1),
(2) Date: May 4, 2023

(87) PCT Pub. No.: WO2023/070549
PCT Pub. Date: May 4, 2023

(65) Prior Publication Data

US 2024/0029670 A1 Jan. 25, 2024

(30) Foreign Application Priority Data

Oct. 26, 2021 (CN) ......................... 202111245802.5

(51) Int. Cl.
*G09G 3/34* (2006.01)

(52) U.S. Cl.
CPC ..... *G09G 3/342* (2013.01); *G09G 2320/0626* (2013.01); *G09G 2360/16* (2013.01)

(58) Field of Classification Search
CPC ................. G09G 3/342; G09G 3/3426; G09G 2320/02–0295; G09G 2320/0626;
(Continued)

(56) References Cited

U.S. PATENT DOCUMENTS

2019/0156770 A1 5/2019 Zha
2021/0012727 A1* 1/2021 Chang .................. G09G 3/3426

FOREIGN PATENT DOCUMENTS

CN 104240650 A 12/2014
CN 107680542 A 2/2018
(Continued)

OTHER PUBLICATIONS

International Search Report in International application No. PCT/CN2021/127542,mailed on Jun. 24, 2022.
(Continued)

*Primary Examiner* — Chanh D Nguyen
*Assistant Examiner* — Aaron Midkiff
(74) *Attorney, Agent, or Firm* — PV IP PC; Wei Te Chung

(57) ABSTRACT

A backlight processing method and device of a display screen, a storage medium, and an electronic device are provided. The method includes: controlling a luminance value of a first type backlight region to be a target luminance value determined according to an image to be displayed; controlling a luminance value of the second type backlight region to be a preset luminance value, the preset luminance value is greater than the target luminance value, and a difference between the preset luminance value and the target luminance value is greater than a preset difference value; and controlling the display panel to display the image to be displayed based on luminance of the first type backlight region and the second type backlight region.

17 Claims, 2 Drawing Sheets

(58) Field of Classification Search
CPC ... G09G 2320/0646; G09G 2320/0686; G09G 2320/10–106; G09G 2360/16; G09G 2320/066; G09G 2340/16
See application file for complete search history.

(56) References Cited

FOREIGN PATENT DOCUMENTS

| | | | |
|---|---|---|---|
| CN | 107689214 | A | 2/2018 |
| CN | 110364123 | A | 10/2019 |
| CN | 110660365 | A | 1/2020 |
| CN | 111210777 | A | 5/2020 |
| CN | 111681620 | A | 9/2020 |
| WO | 2019033780 | A1 | 2/2019 |

OTHER PUBLICATIONS

Written Opinion of the International Search Authority in International application No. PCT/CN2021/127542,mailed on Jun. 24, 2022.
Chinese Office Action issued in corresponding Chinese Patent Application No. 202111245802.5 dated Jun. 24, 2022, pp. 1-7.

* cited by examiner

BACKLIGHT PROCESSING METHOD AND DEVICE OF DISPLAY SCREEN, STORAGE MEDIUM AND ELECTRONIC DEVICE

FIELD OF INVENTION

The present application relates to a display technology, in particular to a backlight processing method and a device of a display screen, a storage medium, and an electronic device.

BACKGROUND OF INVENTION

With the development of display technology, people are not only demanding more and more for the size of the display screen, and for the resolution of the display screen, but also for the definition of the display screen and the picture quality of the display screen. In order to satisfy people's pursuit of high quality of the screen, how to improve the contrast of the image displayed on the display screen has received high attention. However, in the related art, the contrast of the image displayed on the display screen is low.

SUMMARY OF INVENTION

Technical Problem

Embodiments of the present application provide a backlight processing method and a device of a display screen, a storage medium, and an electronic device, so that a contrast of an image to be displayed (or a waiting-to-be-displayed image), which is displayed on a display panel, may be higher.

Technical Solution

According to a first aspect, an embodiment of the present application provides a backlight processing method of a display screen including a backlight module and a display panel that are disposed in a stacked manner, the method comprising:

acquiring an image to be displayed;

dividing a plurality of backlight regions of the backlight module into first type backlight regions and second type backlight regions according to the image to be displayed, when the image to be displayed satisfies a preset condition;

controlling a luminance value of each of the first type backlight regions to be a target luminance value determined according to the image to be displayed;

controlling a luminance value of each of the second type backlight regions to a preset luminance value, wherein the preset luminance value is less than the target luminance value, and a difference between the preset luminance value and the target luminance value is greater than a preset difference value; and controlling the display panel to display the image to be displayed, based on luminance of the first type backlight regions and the second type backlight regions.

In the backlight processing method of the display screen according to the embodiment of the present application, the method further includes:

determining a target luminance value corresponding to each of the backlight regions and an average value corresponding to each of the backlight regions according to the image to be displayed, when the image to be displayed is an n-th frame image or an image after the n-th frame image in a corresponding video;

counting a target number of backlight regions each having a target luminance value not equal to 0;

determining that the image to be displayed satisfies a preset requirement when the target number is greater than a preset number and the average value corresponding to each of the backlight regions is less than a preset average value; and determining that the image to be displayed satisfies the preset condition when all of previous n−1 frame images before the image to be displayed satisfy the preset requirement.

In the backlight processing method of the display screen according to the embodiment of the present application, determining the target luminance value corresponding to each of the backlight regions according to the image to be displayed comprises:

dividing the image to be displayed into a plurality of image regions corresponding to the plurality of backlight regions, wherein one image region corresponds to one backlight region;

determining a grayscale value of each of pixel points of each of the image regions, to obtain a plurality of grayscale values corresponding to each of the image regions and a plurality of grayscale values corresponding to the image to be displayed;

determining an average value of the plurality of grayscale values corresponding to each of the image regions, to obtain an average value corresponding to each of the image regions;

determining a maximum value of the plurality of grayscale values corresponding to each of the image regions, to obtain a maximum value corresponding to each of the image region;

determining an average value of the plurality of grayscale values corresponding to the image to be displayed, to obtain an average value corresponding to the image to be displayed; and determining the target luminance value corresponding to each of the backlight regions according to the average value corresponding to each of the image regions, the maximum value corresponding to each of the image regions, and the average value corresponding to the image to be displayed.

In the backlight processing method of the display screen according to the embodiment of the present application, determining the target luminance value corresponding to each of the backlight regions according to the average value corresponding to each of the image regions, the maximum value corresponding to each of the image regions, and the average value corresponding to the image to be displayed comprises:

calculating a weighted sum of the average value corresponding to each of the image regions, the maximum value corresponding to each of the image regions, and the average value corresponding to the image to be displayed to obtain the target luminance value corresponding to each of the backlight regions.

In the backlight processing method of the display screen according to the embodiment of the present application, determining the grayscale value of each of the pixel points of each of the image regions comprises:

determining a red value, a green value, and a blue value of each of the pixel points of each of the image regions; and determining an average value of the red value, the green value, and the blue value of each of the pixel points of each of the image regions as the grayscale value of each of the pixel points of each of the image regions.

In the backlight processing method of the display screen according to the embodiment of the present application, determining the grayscale value of each of the pixel points of each of the image regions comprises:

determining a red value, a green value, and a blue value of each of the pixel points of each of the image regions; and determining a maximum value of the red value, the green value, and the blue value of each of the pixel points of each of the image regions as the grayscale value of each of the pixel points of each of the image regions.

In the backlight processing method of the display screen according to the embodiment of the present application, dividing the plurality of backlight regions of the backlight module into the first type backlight regions and the second type backlight regions according to the image to be displayed comprises:

determining a target luminance value corresponding to each of the backlight regions according to the image to be displayed;

determining a backlight region having a target luminance value greater than or equal to a preset luminance value among the plurality of backlight regions as the first type backlight region; and determining a backlight region having a target luminance value less than the preset luminance value among the plurality of backlight regions as the second type backlight region According to a second aspect, an embodiment of the present application provides a backlight processing device of a display screen including a backlight module and a display panel which are disposed in a stacked manner, the device comprising:

an acquiring module configured to acquire an image to be displayed;

a dividing module configured to divide a plurality of backlight regions of the backlight module into first type backlight regions and second type backlight regions according to the image to be displayed when the image to be displayed satisfies a preset condition;

a first control module configured to control a luminance value of each of the first type backlight regions to be a target luminance value determined according to the image to be displayed;

a second control module configured to control a luminance value of each of the second type backlight regions to be a preset luminance value, wherein the preset luminance value is less than the target luminance value, and a difference between the preset luminance value and the target luminance value is greater than a preset difference value; and a third control module configured to control the display panel to display the image to be displayed based on luminance of the first type backlight regions and the second type backlight regions.

In the backlight processing device of the display screen according to the embodiment of the present application, the dividing module is configured to:

determine a target luminance value corresponding to each of the backlight regions and an average value corresponding to each of the backlight regions according to the image to be displayed, when the image to be displayed is an n-th frame image or an image after the n-th frame image in a corresponding video;

count a target number of backlight regions each having a target luminance value not equal to 0;

determine that the image to be displayed satisfies a preset requirement when the target number is greater than a preset number and the average value corresponding to each of the backlight regions is less than a preset average value; and determine that the image to be displayed satisfies the preset condition when all of previous n−1 frame images before the image to be displayed satisfy a preset requirement.

In the backlight processing device of the display screen according to the embodiment of the present application, the dividing module is configured to:

divide the image to be displayed into a plurality of image regions corresponding to the plurality of backlight regions, wherein one image region corresponds to one backlight region;

determine a grayscale value of each of pixel points of each of the image regions, to obtain a plurality of grayscale values corresponding to each of the image regions and a plurality of grayscale values corresponding to the image to be displayed;

determine an average value of the plurality of grayscale values corresponding to each of the image regions, to obtain an average value corresponding to each of the image regions;

determine a maximum value of the plurality of grayscale values corresponding to each of the image regions, to obtain a maximum value corresponding to each of the image region;

determine an average value of the plurality of grayscale values corresponding to the image to be displayed, to obtain an average value corresponding to the image to be displayed; and determine the target luminance value corresponding to each of the backlight regions according to the average value corresponding to each of the image regions, the maximum value corresponding to each of the image regions, and the average value corresponding to the image to be displayed.

In the backlight processing device of the display screen according to the embodiment of the present application, the dividing module is configured to:

calculate a weighted sum of the average value corresponding to each of the image regions, the maximum value corresponding to each of the image regions, and the average value corresponding to the image to be displayed to obtain the target luminance value corresponding to each of the backlight regions.

In the backlight processing device of the display screen according to the embodiment of the present application, the dividing module is configured to:

determine a red value, a green value, and a blue value of each of pixel points of each of the image regions; and determine an average value of the red value, the green value, and the blue value of each of the pixel points of each of the image regions as a grayscale value of each of the pixel points of each of the image regions.

According to a third aspect, an embodiment of the present application provides a storage medium in which a plurality of instructions are stored, the instructions being adapted to be loaded by a processor to perform the backlight processing method of the display screen as described above.

According to a fourth aspect, an embodiment of the present application provides an electronic device, comprising:

a display screen comprising a backlight module and a display panel disposed in a stacked manner; and a processor electrically connected to the display screen, wherein the processor is configured to:

acquire an image to be displayed;

divide a plurality of backlight regions of the backlight module into first type backlight regions and second type backlight regions according to the image to be displayed, when the image to be displayed satisfies a preset condition;

control a luminance value of each of the first type backlight regions to be a target luminance value determined according to the image to be displayed;

control a luminance value of each of the second type backlight regions to a preset luminance value, wherein the preset luminance value is less than the target luminance value, and a difference between the preset luminance value and the target luminance value is greater than a preset difference value; and control the display panel to display the image to be displayed, based on luminance of the first type backlight regions and the second type backlight regions.

In the electronic device according to the embodiment of the present application, the processor is configured to:

determine a target luminance value corresponding to each of the backlight regions and an average value corresponding to each of the backlight regions according to the image to be displayed, when the image to be displayed is an n-th frame image or an image after the n-th frame image in a corresponding video;

count a target number of backlight regions each having a target luminance value not equal to 0;

determine that the image to be displayed satisfies a preset requirement when the target number is greater than a preset number and the average value corresponding to each of the backlight regions is less than a preset average value; and determine that the image to be displayed satisfies the preset condition when all of previous n−1 frame images before the image to be displayed satisfy the preset requirement.

In the electronic device according to the embodiment of the present application, the processor is configured to:

divide the image to be displayed into a plurality of image regions corresponding to the plurality of backlight regions, wherein one image region corresponds to one backlight region;

determine a grayscale value of each of pixel points of each of the image regions, to obtain a plurality of grayscale values corresponding to each of the image regions and a plurality of grayscale values corresponding to the image to be displayed;

determine an average value of the plurality of grayscale values corresponding to each of the image regions, to obtain an average value corresponding to each of the image regions;

determine a maximum value of the plurality of grayscale values corresponding to each of the image regions, to obtain a maximum value corresponding to each of the image region;

determine an average value of the plurality of grayscale values corresponding to the image to be displayed, to obtain an average value corresponding to the image to be displayed; and determine the target luminance value corresponding to each of the backlight regions according to the average value corresponding to each of the image regions, the maximum value corresponding to each of the image regions, and the average value corresponding to the image to be displayed.

In the electronic device according to the embodiment of the present application, the processor is configured to:

calculate a weighted sum of the average value corresponding to each of the image regions, the maximum value corresponding to each of the image regions, and the average value corresponding to the image to be displayed to obtain the target luminance value corresponding to each of the backlight regions.

In the electronic device according to the embodiment of the present application, the processor is configured to:

determine a red value, a green value, and a blue value of each of the pixel points of each of the image regions; and determine an average value of the red value, the green value, and the blue value of each of the pixel points of each of the image regions as the grayscale value of each of the pixel points of each of the image regions.

In the electronic device according to the embodiment of the present application, the processor is configured to:

determine a red value, a green value, and a blue value of each of the pixel points of each of the image regions; and determine a maximum value of the red value, the green value, and the blue value of each of the pixel points of each of the image regions as the grayscale value of each of the pixel points of each of the image regions.

In the electronic device according to the embodiment of the present application, the processor is configured to:

determine a target luminance value corresponding to each of the backlight regions according to the image to be displayed;

determine a backlight region having a target luminance value greater than or equal to a preset luminance value among the plurality of backlight regions as the first type backlight region; and determine a backlight region having a target luminance value less than the preset luminance value among the plurality of backlight regions as the second type backlight region.

Advantageous Effects

In the embodiment of the present application, the image to be displayed is acquired; the plurality of backlight regions of the backlight module are divided into the first type backlight regions and the second type backlight regions when the image to be displayed satisfies the preset condition; the luminance value of the first type backlight region is controlled to be the target luminance value determined according to the image to be displayed; the luminance value of the second type backlight region is controlled to be the preset luminance value, the target luminance value is greater than the preset luminance value, and the difference between the preset luminance value and the target luminance value is greater than the preset difference value; the display panel is controlled to display the image to be displayed based on adjusted first type backlight regions and adjusted second type backlight regions, so that the contrast of the finally displayed image to be displayed is higher by making the difference between the luminance values of the first type backlight regions and the luminance values of the second type backlight regions larger.

DESCRIPTION OF DRAWINGS

In order to more clearly illustrate the technical solutions in the embodiments of the present application or in the prior art, the accompanying drawings required for use in the description of the embodiments will be briefly described below. The drawings in the following description are only some embodiments of the present disclosure. For those skilled in the art, without paying any creative work, other drawings may be obtained based on these drawings.

DETAILED DESCRIPTION OF EMBODIMENTS

Figure 1:
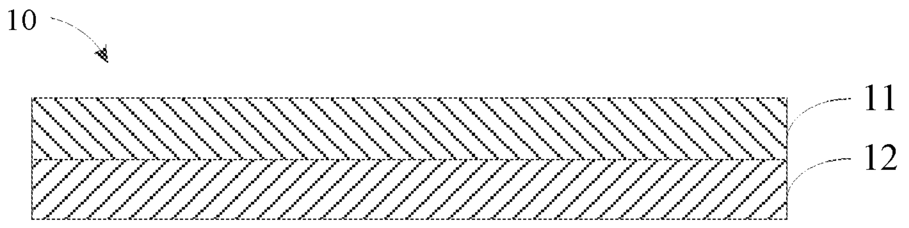
FIG. 1 is a schematic structural diagram of a display screen according to an embodiment of the present application.

Technical solutions in embodiments of the present application will be clearly and completely described below in conjunction with drawings in the embodiments of the present application. Obviously, the described embodiments are only a part of embodiments of the present application, rather than all the embodiments. Based on the embodiments in the present application, all other embodiments obtained by those skilled in the art without creative work fall within the protection scope of the present application.

In the description of the present disclosure, it should be understood that orientations or position relationships indicated by the terms "center", "longitudinal", "lateral", "length", "width", "thickness", "upper", "lower", "front", "rear", "left", "right", "vertical", "horizontal", "top", "bottom", "inside", "outside", "clockwise", and "counter-clockwise" are based on orientations or position relationships illustrated in the drawings. The terms are used to facilitate and simplify the description of the present disclosure, rather than indicate or imply that the devices or elements referred to herein are required to have specific orientations or be constructed or operate in the specific orientations. Accordingly, the terms should not be construed as limiting the present disclosure. In addition, the term "first", "second" are for illustrative purposes only and are not to be construed as indicating or imposing a relative importance or implicitly indicating the number of technical features indicated. Thus, a feature that limited by "first", "second" may expressly or implicitly include one or more of the features. In the description of the present disclosure, the meaning of "plural" is two or more, unless otherwise specifically defined.

In the description of the present disclosure, it should be noted that the terms "installation", "connection" and "coupling" should be understood in a broad sense, unless otherwise clearly specified and defined. For example, it can be a fixed connection, a detachable connection, or integrated connection; it can be a mechanical connection, an electrical connection or can communicate with each other; it can be directly connected or indirectly connected through an intermediary, it can also be the connection between two elements or the interaction between two elements. Those ordinary skilled in the art can understand the specific meanings of the above terms in the present disclosure according to specific situations.

In the present disclosure, it should be noted that unless otherwise clearly defined and limited, a first feature "on" or "under" a second feature may mean that the first feature directly contacts the second feature, or that the first feature contacts the second feature via an additional feature there between instead of directly contacting the second feature. Moreover, the first feature "on", "above", and "over" the second feature may mean that the first feature is right over or obliquely upward over the second feature or simply mean that the first feature has a horizontal height higher than that of the second feature. The first feature "under", "below", and "beneath" the second feature may mean that the first feature is right beneath or obliquely downward beneath the second feature or simply mean that that horizontal height of the first feature is lower than that of the second feature.

The following description provides various embodiments or examples for implementing various structures of the present disclosure. To simplify the description of the present disclosure, parts and settings of specific examples are described as follows. Certainly, they are only illustrative, and are not intended to limit the present disclosure. Further, reference numerals and reference letters may be repeated in different examples of the present application. This repetition is for purposes of simplicity and clarity and does not indicate a relationship of the various embodiments and/or the settings discussed. Furthermore, the present disclosure provides specific examples of various processes and materials, however, applications of other processes and/or other materials may be appreciated by those skilled in the art.

An embodiment of the present application provides a backlight processing method of a display screen, the display screen includes a backlight module and a display panel which are stacked, the method comprises:

- acquiring an image to be displayed;
- dividing a plurality of backlight regions of the backlight module into a first type backlight region(s) and a second type backlight region(s) according to the image to be displayed when the image to be displayed satisfies a preset condition;
- controlling a luminance value of the first type backlight region to be a target luminance value determined according to the image to be displayed;
- controlling a luminance value of the second type backlight region to be a preset luminance value, wherein the preset luminance value is greater than the target luminance value, and a difference between the preset luminance value and the target luminance value is greater than a preset difference value;
- controlling the display panel to display the image to be displayed, based on luminance of the first type backlight region(s) and the second type backlight region(s).

In the embodiment of the present application, the method further comprises:

- determining a target luminance value corresponding to each of the backlight regions and an average value corresponding to each of the backlight regions according to the image to be displayed, when the image to be displayed is an n-th frame image or an image after the n-th frame image in a corresponding video;
- counting a target number of the backlight regions each having a target luminance value not equal to 0;

when the target number is greater than a preset number and the average value corresponding to each of the backlight regions is less than a preset average value, determining that the image to be displayed satisfies a preset requirement;

determining that the image to be displayed satisfies a preset condition when all of previous n−1 frame images before the image to be displayed satisfy a preset requirement.

In the embodiment of the present application, the determining the target luminance value corresponding to each of the backlight regions according to the image to be displayed includes:

dividing the image to be displayed into a plurality of image regions corresponding to the plurality of backlight regions, one image region corresponding to one backlight region;

determining a grayscale value of each of pixel points of each image region, to obtain a plurality of grayscale values corresponding to each image region and a plurality of grayscale values corresponding to the image to be displayed;

determining an average value of the plurality of grayscale values corresponding to each image region, to obtain an average value corresponding to each image region;

determining a maximum value of the plurality of grayscale values corresponding to each image region, to obtain a maximum value corresponding to each image region;

determining an average value of a plurality of grayscale values corresponding to the image to be displayed, to obtain an average value corresponding to the image to be displayed;

determining a target luminance value corresponding to each backlight region according to the average value corresponding to each image region, the maximum value corresponding to each image region, and the average value corresponding to the image to be displayed.

In the embodiment of the present application, determining the target luminance value corresponding to each backlight region according to the average value corresponding to each image region, the maximum value corresponding to each image region, and the average value corresponding to the image to be displayed includes:

calculating a weighted sum of the average value corresponding to each image region, the maximum value corresponding to each image region, and the average value corresponding to the image to be displayed, to obtain the target luminance value corresponding to each backlight region.

In the embodiment of the present application, determining a grayscale value of each pixel point of each image region includes:

determining a red value, a green value, and a blue value of each pixel point of each image region; and determining an average value of the red value, the green value, and the blue value of each pixel point of each image region as the grayscale value of each pixel point of each image region.

In the embodiment of the present application, determining a grayscale value of each pixel point of each image region includes:

determining a red value, a green value, and a blue value of each pixel point of each image region; and determining a maximum value of the red value, the green value, and the blue value of each pixel point of each image region as the grayscale value of each pixel point of each image region.

In the embodiment of the present application, dividing a plurality of backlight regions of the backlight module into a first type backlight region(s) and a second type backlight region(s) according to the image to be displayed includes:

determining a target luminance value corresponding to each backlight region according to the image to be displayed;

determining a backlight region having a target luminance value greater than or equal to a preset luminance value among a plurality of backlight regions as the first type backlight region;

determining a backlight region having a target luminance value less than the preset luminance value among the plurality of backlight regions as the second type backlight region.

Referring to FIG. 1, FIG. 1 is a schematic structural diagram of a display screen according to an embodiment of the present application. The display screen 10 includes a display panel 11 and a backlight module 12.

The display panel 11 and the backlight module 12 are disposed in a stacked manner. The backlight module 12 provides a light source for the display panel 11, so that the display panel 11 may display a corresponding image.

Based on the display screen provided above in the present application, the present application further provides a backlight processing method of the display screen.

Figure 2:
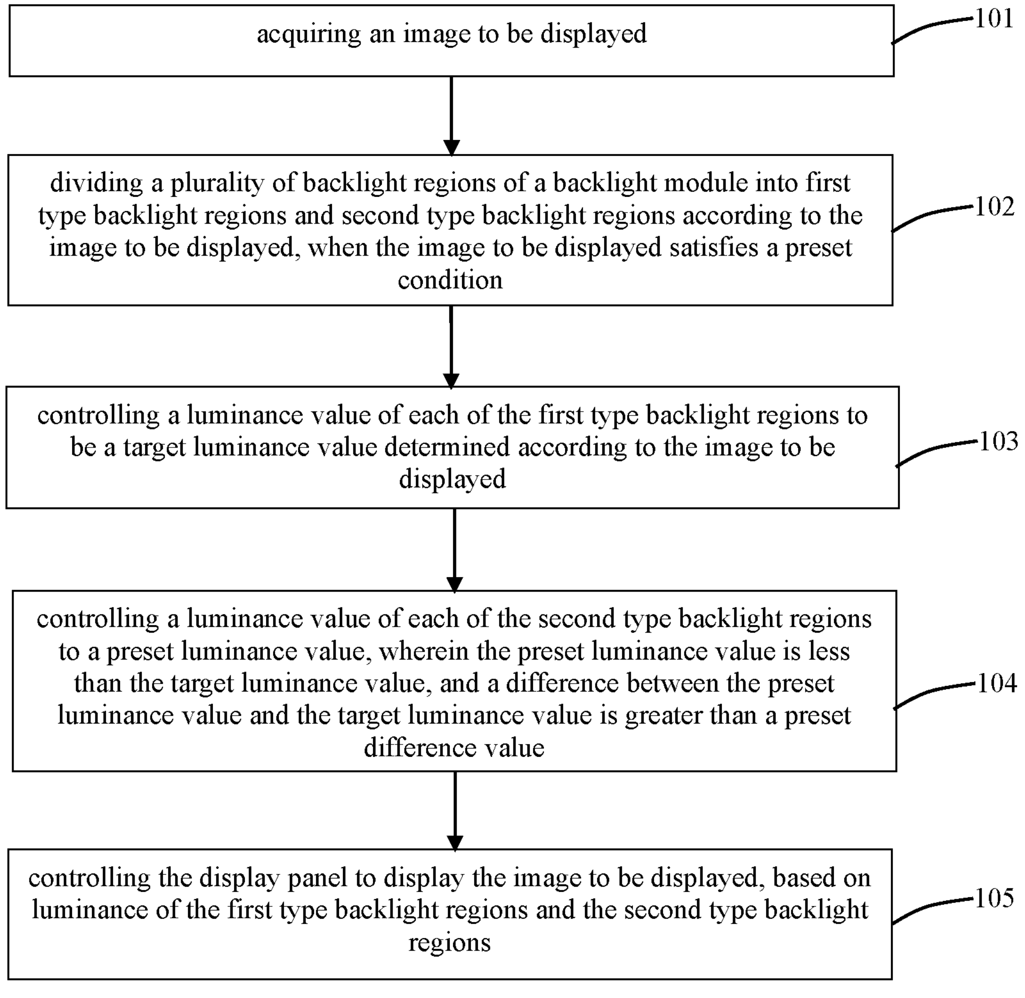
FIG. 2 is a flowchart of a backlight processing method for a display screen according to an embodiment of the present application.

Referring to FIG. 2, FIG. 2 is a flowchart of a backlight processing method of a display screen according to an embodiment of the present application. The flowchart may include:

In step 101, an image to be displayed is acquired.

The image to be displayed is an image to be displayed through a display screen. For example, the image to be displayed may also be one of the frame images in a video.

In step 102, when the image to be displayed satisfies a preset condition, a plurality of backlight regions of the backlight module are divided into a first type backlight region(s) and a second type backlight region(s) according to the image to be displayed.

In this embodiment, after the image to be displayed is acquired, it may be determined whether the image to be displayed satisfies a preset condition. When the image to be displayed satisfies the preset condition, a plurality of backlight regions of the backlight module may be divided into a first type backlight region(s) and a second type backlight region(s) according to the image to be displayed. The first type backlight regions may include at least one backlight region, and the second type backlight regions may also include at least one backlight region. The total number of the first type backlight regions and the second backlight regions is the same as the number of the plurality of backlight regions of the backlight module.

In step 103, the luminance value of the first type backlight region is controlled to be a target luminance value determined according to the image to be displayed.

For example, assuming that there are five first type backlight regions, the luminance values of the five first type backlight regions may be controlled to be the target luminance values determined according to the image to be displayed.

In step 104, a luminance value of the second type backlight region is controlled to be a preset luminance value, the preset luminance value is less than the target luminance value, and a difference between the preset luminance value and the target luminance value is larger than a preset difference value. The preset luminance value may be set according to an actual situation, and is not specifically limited herein.

In this embodiment, for the second type backlight region, the luminance value of the second type backlight region may be controlled to the preset luminance value. The preset luminance value may be set according to an actual situation. The preset luminance value needs to satisfy a condition that the preset luminance value is less than the target luminance value, and the difference between the preset luminance value and the target luminance value is greater than the preset difference value.

In step 105, the display panel is controlled to display the image to be displayed based on the luminance of the first type backlight region and the second type backlight region.

In this embodiment, after controlling the luminance value of the first type backlight region to be the target luminance value determined according to the image to be displayed and controlling the luminance value of the second type backlight region to be the preset luminance value, the display panel may be controlled to display the image to be displayed based on the luminance of the first type backlight region and the second type backlight region, so that the contrast of the image to be displayed is relatively higher.

In the embodiment of the present application, the image to be displayed is acquired; the plurality of backlight regions of the backlight module are divided into the first type backlight region and the second type backlight region when the image to be displayed satisfies the preset condition; the luminance value of the first type backlight region is controlled to be the target luminance value determined according to the image to be displayed; the luminance value of the second type backlight region is controlled to be the preset luminance value, the target luminance value is greater than the preset luminance value, and the difference between the preset luminance value and the target luminance value is greater than the preset difference value; the display panel is controlled to display the image to be displayed based on adjusted first type backlight region and adjusted second type backlight region, so that the contrast of the finally displayed image to be displayed is higher by making the difference between the luminance value of the first type backlight region and the luminance value of the second type backlight region larger.

In an alternative embodiment, the backlight processing method of the display screen may further include:

- determining a target luminance value and an average value corresponding to each backlight region according to the image to be displayed when the image to be displayed is an n-th frame image or an image after the n-th frame image in a corresponding video;
- counting the target number of the backlight regions whose target luminance values are not equal to 0;
- when the target number is greater than a preset number and the average value corresponding to each backlight area is less than a preset average value, determining that the image to be displayed satisfies a preset requirement;
- when all of previous n−1 frame images before the image to be displayed satisfy the preset requirement, it is determined that the image to be displayed satisfies the preset condition.

Wherein n may be a positive integer greater than one.

For example, after the image to be displayed is acquired, it may be first determined whether the image to be displayed is the n-th frame image or the image after the n-th frame image in the corresponding video. Specifically, whether the image to be displayed is a frame image in the corresponding video can be determined by comparing the similarity between the image to be displayed and the previous frame image before the image to be displayed; wherein, when the similarity between the image to be displayed and the previous frame image is greater than a preset similarity, it can be determined that the image to be displayed is a frame image in the corresponding video; when the similarity between the image to be displayed and the previous frame image is smaller than the preset similarity, it may be determined that the image to be displayed is not a frame image in the corresponding video. The preset similarity may be set according to actual conditions, and is not specifically limited herein.

When the image to be displayed is one frame image in the corresponding video, it may continue to determine whether the image to be displayed is the n-th frame image in the corresponding video by comparing the similarity between adjacent images of the previous n−1 frame images before the image to be displayed. By analogy, it is also possible to continue to determine whether the image to be displayed is an image after the n-th frame image in the corresponding video by comparing the similarity between adjacent images of the images before the image after the n-th frame image. The corresponding video may be any video.

When the image to be displayed is the n-th frame image or the image after the n-th frame image in the corresponding video, the target luminance value corresponding to each backlight region and the average value corresponding to each backlight region may be determined according to the image to be displayed.

Subsequently, the target number of the backlight regions whose target luminance values are not equal to 0 may be counted. For example, when there are 5 backlight regions whose target luminance values are not equal to 0, it may be determined that the target number is 5.

Next, it may be determined whether the target number is greater than a preset number. The preset number may be set according to actual conditions, and is not specifically limited herein. For example, if the target number is 5 and the preset number is 4, it can be determined that the target number is greater than the preset number.

It may also be determined whether the average value corresponding to each backlight region is less than the preset average value. The preset average value may be set according to actual conditions, and is not specifically limited herein. For example, when the average value corresponding to a certain backlight region is 112 and the preset average value is 150, it may be determined that the average value corresponding to the backlight region is less than the preset average value.

When the target number is greater than the preset number and the average value corresponding to each backlight region is less than the preset average value, it may be determined that the image to be displayed satisfies the preset requirement. It is also possible to determine whether the previous n−1 frame images before the image to be displayed satisfy the preset requirements according to the same process as described above. For example, for any of the previous n−1 frame images before the image to be displayed, a luminance value and an average value corresponding to each backlight region may be determined based on this image. Then, the number of backlight regions whose luminance value is not equal to 0 is counted, and when the number is greater than the preset number and the average value corresponding to each backlight region is less than the preset average value, it is determined that the image satisfies the preset requirement. When the previous n−1 frame images before the image to be displayed also satisfy the preset requirement, it may be determined that the image to be displayed meets the preset condition.

When the image to be displayed satisfies any of the following conditions: the image to be displayed is the (n−1)-th frame image or an image before the (n−1)-th frame image in the corresponding video, the target number is less than or equal to the preset number, the average value corresponding to at least one of the plurality of backlight regions is greater than or equal to the preset average value, and at least one of the previous n−1 frame images of the image to be displayed does not satisfy the preset requirement, it may be determined that the image to be displayed does not satisfy the preset condition. When the image to be displayed does not satisfy a preset condition, the image to be displayed may be displayed in a display manner in the related art.

In an alternative embodiment, determining an average value corresponding to each backlight region may include:

- dividing an image to be displayed into a plurality of image regions corresponding to a plurality of backlight regions, one image region corresponds to one backlight region;
- determining a grayscale value of each pixel point of each image region, to obtain a plurality of grayscale values corresponding to each image region;
- determining an average value of the plurality of grayscale values corresponding to each image region, to obtain an average value corresponding to each image region.

For example, first, the image to be displayed is divided into a plurality of image regions corresponding to a plurality of backlight regions. For example, assuming that there are 12 backlight regions, there are also 12 image regions, wherein one backlight region corresponds to one image region. Further, since the backlight module and the display panel are stacked, the image to be displayed is displayed through the display panel, and when a certain image region of the image to be displayed is displayed on the upper left corner of the display panel, the backlight region corresponding to the image region is also on the upper left corner of the backlight module.

Then, a grayscale value of each pixel point of each image region may be determined to obtain a plurality of grayscale values corresponding to each image region. For example, assuming that an image region has 100 pixel points, there are 100 grayscale values corresponding to the image region.

Then, an average value of the plurality of grayscale values corresponding to each image region may be determined, and an average value corresponding to each image region may be obtained. For example, assuming that the plurality of grayscale values corresponding to a certain image region are respectively 152, 154, 155, 160, and 161, the average value corresponding to this image region is 156.4.

In an optional embodiment, determining a target luminance value corresponding to each backlight region according to the image to be displayed may include:

- dividing an image to be displayed into a plurality of image regions corresponding to a plurality of backlight regions, one image region corresponds to one backlight region;
- determining a grayscale value of each pixel point of each image region, to obtain a plurality of grayscale values corresponding to each image region and a plurality of grayscale values corresponding to the image to be displayed;
- determining an average value of the plurality of grayscale values corresponding to each image region, to obtain an average value corresponding to each image region;
- determining a maximum value of the plurality of grayscale values corresponding to each image region, to obtain a maximum value corresponding to each image region;
- determining an average value of the plurality of grayscale values corresponding to the image to be displayed, to obtain an average value corresponding to the image to be displayed;
- determining a target luminance value corresponding to each backlight region according to the average value corresponding to each image region, the maximum value corresponding to each image region, and the average value corresponding to the image to be displayed.

For example, first, the image to be displayed is divided into a plurality of image regions corresponding to a plurality of backlight regions. For example, assuming that there are 12 backlight regions, there are also 12 image regions, wherein one backlight region corresponds to one image region. Further, since the backlight module and the display panel are stacked, the image to be displayed is displayed through the display panel, and when a certain image region of the image to be displayed is displayed on the upper left corner of the display panel, the backlight region corresponding to the image region is also on the upper left corner of the backlight module.

Then, a grayscale value of each pixel point of each image region may be determined to obtain a plurality of grayscale values corresponding to each image region and a plurality of grayscale values corresponding to an image to be displayed. For example, assuming that there are 10 image regions in total, and each image region has 100 pixel points, there are 100 grayscale values corresponding to each image region, and there are 1000 grayscale values corresponding to the image to be displayed.

Then, an average value of a plurality of grayscale values corresponding to each image region may be determined, and the average value corresponding to each image region may be obtained. For example, assuming that a plurality of grayscale values corresponding to a certain image region are respectively 152, 154, 155, 160, and 161, the average value corresponding to this image region is 156.4.

A maximum value of the plurality of grayscale values corresponding to each image region may be determined to obtain the maximum value corresponding to each image region. For example, assuming that the plurality of grayscale values corresponding to a certain image region are 152, 154, 155, 160, and 161, respectively, the maximum value corresponding to this image region is 161.

An average value of a plurality of grayscale values corresponding to the image to be displayed may be determined to obtain the average value corresponding to the image to be displayed. For example, assuming that the plurality of grayscale values corresponding to the image to be displayed are 152, 154, 155, 160, 161, 162, 164, 165, 167, and 168, respectively, the average value corresponding to the image to be displayed is 160.8.

After the average value corresponding to each image region, the maximum value corresponding to each image region, and the average value corresponding to the image to be displayed are determined, the target luminance value corresponding to each backlight region may be determined according to the average value corresponding to each image region, the maximum value corresponding to each image region, and the average value corresponding to the image to be displayed.

In an alternative embodiment, determining the grayscale value of each pixel point of each image region may include:

- determining a red value, a green value, and a blue value of each pixel point of each image region;
- determining an average value of a red value, a green value, and a blue value of each pixel point of each image region as a grayscale value of each pixel point of each image region.

It is understood that each pixel point is composed of red, green, and blue primary colors so that each pixel point includes corresponding red, green, and blue values. In the present embodiment, the red value, the green value, and the blue value of each pixel point of each image region may be determined, and the average value of the red value, the green value, and the blue value of each pixel point of each image region may be taken as the gray value of each pixel point of each image region. For example, if the red, green, and blue values of a certain pixel point are 156, 240, and 138, respectively, the grayscale value of the pixel point is 178.

In an alternative embodiment, determining the grayscale value of each pixel point of each image region may include:

- determining a red value, a green value, and a blue value of each pixel point of each image region;
- determining a maximum value of the red value, the green value, and the blue value of each pixel point of each image region as a grayscale value of each pixel point of each image region.

It is understood that each pixel point is composed of red, green, and blue primary colors so that each pixel point includes corresponding red, green, and blue values. In the present embodiment, the red value, the green value, and the blue value of each pixel point of each image region may be determined, and the maximum value of the red value, the green value, and the blue value of each pixel point of each image region may be taken as the grayscale value of each pixel point of each image region. For example, if the red, green, and blue values of a certain pixel point are 156, 240, and 138, respectively, the grayscale value of the pixel point is 240.

In an optional embodiment, determining the target luminance value corresponding to each backlight region according to the average value corresponding to each image region, the maximum value corresponding to each image region, and the average value corresponding to the image to be displayed may include:

- calculating a weighted sum of the average value corresponding to each image region, the maximum value corresponding to each image region, and the average value corresponding to the image to be displayed, to obtain the target luminance value corresponding to each backlight region.

For example, the weight values corresponding to, respectively, the average value corresponding to each image region, the maximum value corresponding to each image region, and average value corresponding to the image to be displayed may be acquired. Wherein the weight values corresponding to, respectively, the average value corresponding to each image region, the maximum value corresponding to each image region, and the average value corresponding to the image to be displayed are debugged according to the actual effect. The sum of the weight values corresponding to, respectively, the average value corresponding to each image region, the maximum value corresponding to each image region, and the average value corresponding to the image to be displayed is 1.

Then, the product of the average value corresponding to each image region and the weight value corresponding to the average value corresponding to each image region, the product of the maximum value corresponding to each image region and the weight value corresponding to the maximum value corresponding to each image region, and the product of the average value corresponding to the image to be displayed and the weight value corresponding to the average value corresponding to the image to be displayed may be calculated, to obtain the first product, the second product, and the third product corresponding to each backlight region. The first product, the second product, and the third product corresponding to a certain backlight region are respectively a product of the average value corresponding to the image region corresponding to the backlight region and its corresponding weight value, a product of the maximum value corresponding to the image region corresponding to the backlight region and its corresponding weight value, and a product of the average value corresponding to the image to be displayed and its corresponding weight value.

Finally, the sum of the first product, the second product, and the third product corresponding to each backlight region may be used as the target luminance value corresponding to each backlight region.

It may be understood that the target luminance value corresponding to each backlight region may also be determined according to the average value corresponding to each image region, the maximum value corresponding to each image region, the average value corresponding to the image to be displayed, and other parameter information. Other parameter information may be set according to actual conditions, and is not specifically limited herein.

In an alternative embodiment, dividing the plurality of backlight regions of the backlight module into a first type backlight region and a second type backlight region may include:

- determining a target luminance value corresponding to each backlight region according to an image to be displayed;
- determining a backlight region having a target luminance value greater than or equal to a preset luminance value among a plurality of backlight regions as a first type of backlight region;
- determining a backlight region having the target luminance value less than the preset luminance value among the plurality of backlight regions as a second type backlight region.

For example, first, a target luminance value corresponding to each backlight region may be determined according to an image to be displayed. Then, the target luminance value corresponding to each backlight region may be compared with the preset luminance value. A backlight region having a target luminance value greater than or equal to a preset luminance value among the plurality of backlight regions is determined as a first type backlight region, and a backlight region having a target luminance value less than the preset luminance value is determined as a second type backlight region. For example, assuming that there are 10 backlight regions, where the target luminance values of 3 backlight regions are greater than or equal to the preset luminance value, and the target luminance values of 7 backlight regions are less than the preset luminance value, it may be determined that there are three first type backlight regions and seven second type backlight regions.

It should be noted that, how to determine the target luminance value corresponding to each backlight region according to the image to be displayed is described in the foregoing embodiment, and details are not described herein.

In an alternative embodiment, when the luminance value of the first type backlight region is controlled to be a target luminance value determined according to the image to be displayed, the image to be displayed may be divided into a plurality of image regions corresponding to the plurality of backlight regions; then, an image region corresponding to the first type backlight region may be determined from the plurality of image regions to obtain a target image region; the grayscale values of each pixel point of the target image region may be determined to obtain a plurality of grayscale values corresponding to the target image region; the grayscale value of each pixel point in the image to be displayed may be determined to obtain a plurality of grayscale values corresponding to the image to be displayed; determining an average value of a plurality of grayscale values corresponding to the target image region, to obtain an average value corresponding to the target image region; determining a maximum value of a plurality of grayscale values corresponding to a target image region to obtain a maximum value corresponding to the target image region; determining an average value of a plurality of grayscale values corresponding to the image to be displayed, to obtain an average value corresponding to the image to be displayed; determining a target luminance value corresponding to the first type backlight region according to an average value corresponding to the target image region, the maximum value corresponding to the target image region, and the average value corresponding to the image to be displayed; after the target luminance value corresponding to the first type backlight region is determined, the luminance value of the first type backlight region may be controlled to be the target luminance value.

It may be understood that when there are a plurality of first type backlight regions, the target luminance value corresponding to each first type backlight region may be determined according to the average value and the maximum value corresponding to the image region corresponding to each first type backlight region and the average value corresponding to the image to be displayed through the above-described manner. Subsequently, the luminance value of each first type backlight region may be controlled to be a target luminance value corresponding to each first type backlight region. For example, if the target luminance value of a certain first type backlight region is 115, the luminance value of this first type backlight region may be controlled to be 115.

It should be noted that in the embodiments of the present application, "a plurality of" includes "two" or "two or more".

Based on the display screen provided above in the present application, the present application further provides a backlight processing device of the display screen.

Figure 3:
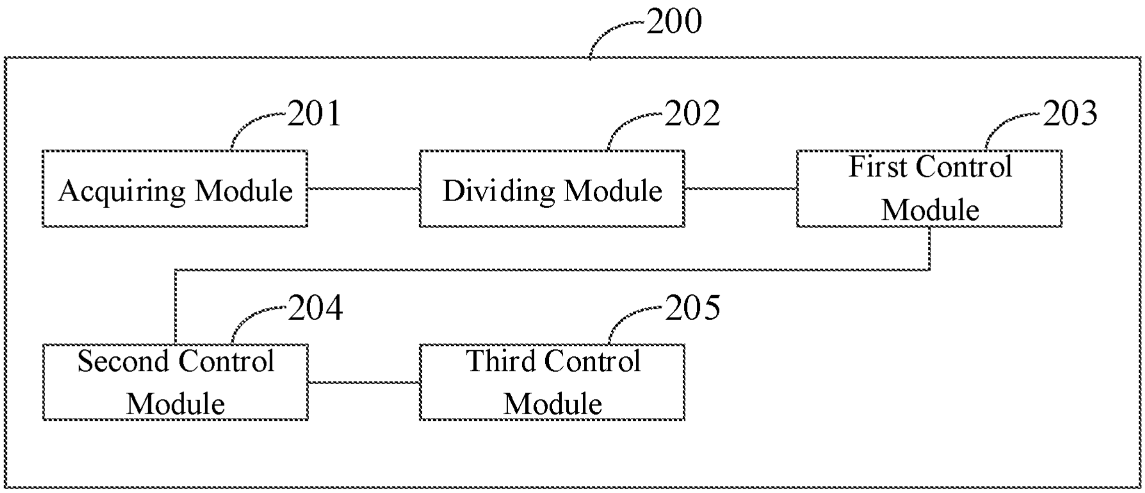
FIG. 3 is a schematic structural diagram of a backlight processing device for a display screen according to an embodiment of the present application.

Referring to FIG. 3, FIG. 3 is a schematic structural diagram of a backlight processing device of a display screen according to an embodiment of the present application. The backlight processing device 200 includes an acquiring module 201, a dividing module 202, a first control module 203, a second control module 204, and a third control module 205.

The acquiring module 201 is configured to acquire an image to be displayed.

The dividing module 202 is configured to divide a plurality of backlight regions of the backlight module into a first type backlight region and a second type backlight region according to the image to be displayed, when the image to be displayed satisfies a preset condition.

The first control module 203 is configured to control the luminance value of the first type backlight region to be a target luminance value determined according to the image to be displayed.

The second control module 204 is configured to control a luminance value of the second type backlight region to be a preset luminance value, wherein the preset luminance value is less than the target luminance value, and a difference between the preset luminance value and the target luminance value is greater than the preset difference value.

The third control module 205 is configured to control the display panel to display the image to be displayed, based on luminance of the first type backlight region and the second type backlight region.

In some embodiments, the dividing module 202 may be configured to: determine a target luminance value and an average value corresponding to each backlight region according to the image to be displayed when the image to be displayed is the n-th frame image or an image after the n-th frame image in the corresponding video; count the target number of the backlight region whose target luminance value is not equal to 0; determine that the image to be displayed satisfies a preset requirement when the target number is greater than a preset number and an average value corresponding to each backlight area is less than a preset average value; determine that the image to be displayed satisfies a preset condition when each of the previous n−1 frame images before the image to be displayed satisfies a preset requirement.

In some embodiments, the dividing module 202 may be configured to: divide the image to be displayed into a plurality of image regions corresponding to a plurality of the backlight regions, one image region corresponds to a backlight region; determine a grayscale value of each pixel point of each image region to obtain a plurality of grayscale values corresponding to each image region and a plurality of grayscale values corresponding to the image to be displayed; determine an average value of the plurality of grayscale values corresponding to each image region, to obtain the average value corresponding to each image region; determine a maximum value of the plurality of grayscale values corresponding to each image region to obtain the maximum value corresponding to each image region; determine an average value of the plurality of grayscale values corresponding to the image to be displayed to obtain the average value corresponding to the image to be displayed; determine a target luminance value corresponding to each backlight region according to the average value corresponding to each image region, the maximum value corresponding to each image region, and the average value corresponding to the image to be displayed.

In some embodiments, the dividing module 202 may be configured to: calculate a weighted sum of the average value corresponding to each image region, the maximum value corresponding to each image region, and the average value corresponding to the image to be displayed to obtain a target luminance value corresponding to each backlight region.

In some embodiments, the dividing module 202 may be configured to: determine red, green, and blue values of each pixel point of each image region; determine an average value of the red value, the green value, and the blue value of each pixel point of each image region as the grayscale value of each pixel point of each image region.

In some embodiments, the dividing module 202 may be configured to: determine red, green, and blue values of each pixel point of each image region; determine a maximum value of the red value, the green value, and the blue value of each pixel point of each image region as a grayscale value of each pixel point of each image region.

In some embodiments, the dividing module 202 may be configured to: determine a target luminance value corresponding to each backlight region according to the image to be displayed; determine a backlight region having a target luminance value greater than or equal to a preset luminance value among a plurality of backlight regions as a first type backlight region; determine a backlight region having a target luminance value less than the preset luminance value among the plurality of backlight regions as a second type backlight region.

Figure 4:
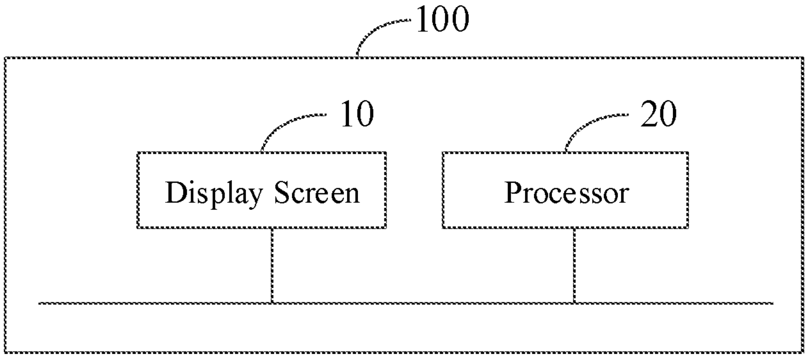
FIG. 4 is a schematic structural diagram of an electronic device according to an embodiment of the present application.

In an alternative embodiment, referring to FIG. 4, FIG. 4 is a schematic structural diagram of an electronic device according to an embodiment of the present application. The electronic device 100 includes a display screen 10 and a processor 20. The processor 20 is electrically connected to the display screen 10.

The display screen 10 includes a backlight module and a display panel disposed in a stacked manner.

The processor 20 is a general purpose processor, such as a processor of an ARM architecture.

The processor 20 is configured to:

acquire an image to be displayed;

divide a plurality of backlight regions of the backlight module into a first type backlight region(s) and a second type backlight region(s) according to the image to be displayed, when the image to be displayed satisfies a preset condition;

control a luminance value of the first type backlight region to be a target luminance value determined according to the image to be displayed;

control a luminance value of the second type backlight region to be a preset luminance value, wherein the preset luminance value is less than the target luminance value, and a difference between the preset luminance value and the target luminance value is greater than the preset difference value;

control a display panel to display the image to be displayed based on luminance of the first type backlight region and the second type backlight region.

In an alternative embodiment, the processor 20 is configured to:

determine a target luminance value and an average value corresponding to each backlight region according to the image to be displayed, when the image to be displayed is a n-th frame image or an image after the n-th frame image in the corresponding video;

count the target number of the backlight regions each having a target luminance value not equal to 0;

when the target number is greater than a preset number and an average value corresponding to each backlight area is less than a preset average value, determine that the image to be displayed satisfies a preset requirement;

determine that the image to be displayed satisfies the preset condition when all of previous n−1 frame images of the image to be displayed satisfy a preset requirement.

In an alternative embodiment, the processor 20 is configured to:

divide the image to be displayed into a plurality of image regions corresponding to a plurality of the backlight regions, one image region corresponds to one backlight region;

determine a grayscale value of each pixel point of each image region, to obtain a plurality of grayscale values corresponding to each image region and a plurality of grayscale values corresponding to the image to be displayed;

determine an average value of a plurality of grayscale values corresponding to each image region, to obtain an average value corresponding to each image region;

determine a maximum value of the plurality of grayscale values corresponding to each image region, to obtain a maximum value corresponding to each image region;

determine an average value of the plurality of grayscale values corresponding to the image to be displayed, to obtain an average value corresponding to the image to be displayed;

determine a target luminance value corresponding to each backlight region according to the average value corresponding to each image region, the maximum value corresponding to each image region, and the average value corresponding to the image to be displayed.

In an alternative embodiment, the processor 20 is configured to:

calculate the weighted sum of the average value corresponding to each image region, the maximum value corresponding to each image region, and the average value corresponding to the image to be displayed to obtain the target luminance value corresponding to each backlight region.

In an alternative embodiment, the processor 20 is configured to:

determine a red value, a green value, and a blue value of each pixel point of each image region;

determine an average value of a red value, a green value, and a blue value of each pixel point of each image region as a grayscale value of each pixel point of each image region.

In an alternative embodiment, the processor 20 is configured to:

determine a red value, a green value, and a blue value of each pixel point of each image region;

determine a maximum value of the red value, the green value, and the blue value of each pixel point of each image region as the grayscale value of each pixel point of each image region.

In an alternative embodiment, the processor 20 is configured to:

determine a target luminance value corresponding to each backlight region according to the image to be displayed;

determine a backlight region having a target luminance value greater than or equal to a preset luminance value among a plurality of backlight regions as a first type backlight region;

determine a backlight region having a target luminance value less than the preset luminance value among the plurality of backlight regions as s second type backlight region.

It should be noted that the electronic device 100 provided in the embodiment of the present application belongs to the same concept as the backlight processing method of the display screen in the foregoing embodiment, for a detailed implementation process thereof, please refer to the embodiment of the backlight processing method of the display screen, and details are not described herein again.

It should be noted that, with respect to the backlight processing method of the display screen according to the embodiment of the present application, the ordinary tester in the art may understand that all or a part of the flow of implementing the backlight processing method of the display screen according to the embodiment of the present application may be completed by controlling relevant hardware by a computer program. The computer program may be stored in a computer readable storage medium, such as a memory of an electronic device, and executed by a processor in the electronic device. In the execution process, the flow of the embodiment of the backlight processing method of the display screen may be included. The storage medium may be a magnetic disk, an optical disk, a read-only memory, a random access memory, or the like.

A backlight processing method and device of a display screen, a storage medium, and an electronic device provided in the embodiments of the present application are described in detail above. Specific examples are used in this article to illustrate the principles and implementations of the present disclosure. The description of the embodiments is merely intended to help understand the methods and core ideas of the present application. At the same time, a person skilled in the art may make changes in the specific embodiments and application scope according to the idea of the present application. In conclusion, the content of the specification should not be construed as a limitation to the present application.

What is claimed is:

1. A backlight processing method of a display screen, wherein the display screen comprises a backlight module and a display panel which are arranged in a stacked manner, the backlight processing method comprises:

acquiring an image to be displayed;

dividing a plurality of backlight regions of the backlight module into first type backlight regions and second type backlight regions according to the image to be displayed, when the image to be displayed satisfies a preset condition;

controlling a luminance value of each of the first type backlight regions to be a target luminance value determined according to the image to be displayed;

controlling a luminance value of each of the second type backlight regions to a preset luminance value, wherein the preset luminance value is less than the target luminance value, and a difference between the preset luminance value and the target luminance value is greater than a preset difference value;

controlling the display panel to display the image to be displayed, based on luminance of the first type backlight regions and the second type backlight regions, determining a target luminance value corresponding to each of the backlight regions and an average value corresponding to each of the backlight regions according to the image to be displayed, when the image to be displayed is an n-th frame image or an image after the n-th frame image in a corresponding video;

counting a target number of backlight regions each having a target luminance value not equal to 0;

determining that the image to be displayed satisfies a preset requirement when the target number is greater than a preset number and the average value corresponding to each of the backlight regions is less than a preset average value; and determining that the image to be displayed satisfies the preset condition when all of previous n−1 frame images before the image to be displayed satisfy the preset requirement.

2. The backlight processing method of the display screen according to claim 1, wherein determining the target luminance value corresponding to each of the backlight regions according to the image to be displayed comprises:

dividing the image to be displayed into a plurality of image regions corresponding to the plurality of backlight regions, wherein one image region corresponds to one backlight region;

determining a grayscale value of each of pixel points of each of the image regions, to obtain a plurality of grayscale values corresponding to each of the image regions and a plurality of grayscale values corresponding to the image to be displayed;

determining an average value of the plurality of grayscale values corresponding to each of the image regions, to obtain an average value corresponding to each of the image regions;

determining a maximum value of the plurality of grayscale values corresponding to each of the image regions, to obtain a maximum value corresponding to each of the image region;

determining an average value of the plurality of grayscale values corresponding to the image to be displayed, to obtain an average value corresponding to the image to be displayed; and determining the target luminance value corresponding to each of the backlight regions according to the average value corresponding to each of the image regions, the maximum value corresponding to each of the image regions, and the average value corresponding to the image to be displayed.

3. The backlight processing method of the display screen according to claim 2, wherein determining the target luminance value corresponding to each of the backlight regions according to the average value corresponding to each of the image regions, the maximum value corresponding to each of the image regions, and the average value corresponding to the image to be displayed comprises:

calculating a weighted sum of the average value corresponding to each of the image regions, the maximum value corresponding to each of the image regions, and the average value corresponding to the image to be displayed to obtain the target luminance value corresponding to each of the backlight regions.

4. The backlight processing method of the display screen according to claim 2, wherein determining the grayscale value of each of the pixel points of each of the image regions comprises:

determining a red value, a green value, and a blue value of each of the pixel points of each of the image regions; and determining an average value of the red value, the green value, and the blue value of each of the pixel points of each of the image regions as the grayscale value of each of the pixel points of each of the image regions.

5. The backlight processing method of the display screen according to claim 2, wherein determining the grayscale value of each of the pixel points of each of the image regions comprises:

determining a red value, a green value, and a blue value of each of the pixel points of each of the image regions; and determining a maximum value of the red value, the green value, and the blue value of each of the pixel points of each of the image regions as the grayscale value of each of the pixel points of each of the image regions.

6. The backlight processing method of a display screen according to claim 1, wherein dividing the plurality of backlight regions of the backlight module into the first type backlight regions and the second type backlight regions according to the image to be displayed comprises:

determining a target luminance value corresponding to each of the backlight regions according to the image to be displayed;

determining a backlight region having a target luminance value greater than or equal to a preset luminance value among the plurality of backlight regions as the first type backlight region; and determining a backlight region having a target luminance value less than the preset luminance value among the plurality of backlight regions as the second type backlight region.

7. A non-transitory storage medium, wherein a plurality of instructions are stored in the non-transitory storage medium, the plurality of instructions are adapted to be loaded by a processor to perform the backlight processing method of the display screen according to claim 1.

8. A backlight processing device of a display screen, wherein the display screen comprises a backlight module and a display panel which are arranged in a stacked manner, the backlight processing device comprises:

an acquirer configured to acquire an image to be displayed;

a divider configured to divide a plurality of backlight regions of the backlight module into first type backlight regions and second type backlight regions according to the image to be displayed when the image to be displayed satisfies a preset condition;

a first controller to control a luminance value of each of the first type backlight regions to be a target luminance value determined according to the image to be displayed;

a second controller configured to control a luminance value of each of the second type backlight regions to be a preset luminance value, wherein the preset luminance value is less than the target luminance value, and a difference between the preset luminance value and the target luminance value is greater than a preset difference value; and a third controller configured to control the display panel to display the image to be displayed based on luminance of the first type backlight regions and the second type backlight regions, wherein the divider is configured to:

determine a target luminance value corresponding to each of the backlight regions and an average value corresponding to each of the backlight regions according to the image to be displayed, when the image to be displayed is an n-th frame image or an image after the n-th frame image in a corresponding video;

count a target number of backlight regions each having a target luminance value not equal to 0;

determine that the image to be displayed satisfies a preset requirement when the target number is greater than a preset number and the average value corresponding to each of the backlight regions is less than a preset average value; and determine that the image to be displayed satisfies the preset condition when all of previous n−1 frame images before the image to be displayed satisfy the preset requirement.

9. The backlight processing device of the display screen according to claim 8, wherein the divider is configured to: divide the image to be displayed into a plurality of image regions corresponding to the plurality of backlight regions, wherein one image region corresponds to one backlight region; determine a grayscale value of each of pixel points of each of the image regions, to obtain a plurality of grayscale values corresponding to each of the image regions and a plurality of grayscale values corresponding to the image to be displayed; determine an average value of the plurality of grayscale values corresponding to each of the image regions, to obtain an average value corresponding to each of the image regions; determine a maximum value of the plurality of grayscale values corresponding to each of the image regions, to obtain a maximum value corresponding to each of the image region; determine an average value of the plurality of grayscale values corresponding to the image to be displayed, to obtain an average value corresponding to the image to be displayed; and determine the target luminance value corresponding to each of the backlight regions according to the average value corresponding to each of the image regions, the maximum value corresponding to each of the image regions, and the average value corresponding to the image to be displayed.

10. The backlight processing device of the display screen according to claim 9, wherein the divider is configured to: calculate a weighted sum of the average value corresponding to each of the image regions, the maximum value corresponding to each of the image regions, and the average value corresponding to the image to be displayed to obtain the target luminance value corresponding to each of the backlight regions.

11. The backlight processing device of the display screen according to claim 9, wherein the divider is configured to: determine a red value, a green value, and a blue value of each of pixel points of each of the image regions; and determine an average value of the red value, the green value, and the blue value of each of the pixel points of each of the image regions as a grayscale value of each of the pixel points of each of the image regions.

12. An electronic device comprising:

a display screen comprising a backlight module and a display panel disposed in a stacked manner; and a processor electrically connected to the display screen, wherein the processor is configured to:

acquire an image to be displayed;

divide a plurality of backlight regions of the backlight module into first type backlight regions and second type backlight regions according to the image to be displayed, when the image to be displayed satisfies a preset condition;

control a luminance value of each of the first type backlight regions to be a target luminance value determined according to the image to be displayed;

control a luminance value of each of the second type backlight regions to a preset luminance value, wherein the preset luminance value is less than the target luminance value, and a difference between the preset luminance value and the target luminance value is greater than a preset difference value;

control the display panel to display the image to be displayed, based on luminance of the first type backlight regions and the second type backlight regions, determine a target luminance value corresponding to each of the backlight regions and an average value corresponding to each of the backlight regions according to the image to be displayed, when the image to be displayed is an n-th frame image or an image after the n-th frame image in a corresponding video;

count a target number of backlight regions each having a target luminance value not equal to 0;

determine that the image to be displayed satisfies a preset requirement when the target number is greater than a preset number and the average value corresponding to each of the backlight regions is less than a preset average value; and determine that the image to be displayed satisfies the preset condition when all of previous n−1 frame images before the image to be displayed satisfy the preset requirement.

13. The electronic device according to claim 12, wherein the processor is configured to:

divide the image to be displayed into a plurality of image regions corresponding to the plurality of backlight regions, wherein one image region corresponds to one backlight region;

determine a grayscale value of each of pixel points of each of the image regions, to obtain a plurality of grayscale values corresponding to each of the image regions and a plurality of grayscale values corresponding to the image to be displayed;

determine an average value of the plurality of grayscale values corresponding to each of the image regions, to obtain an average value corresponding to each of the image regions;

determine a maximum value of the plurality of grayscale values corresponding to each of the image regions, to obtain a maximum value corresponding to each of the image region;

determine an average value of the plurality of grayscale values corresponding to the image to be displayed, to obtain an average value corresponding to the image to be displayed; and determine the target luminance value corresponding to each of the backlight regions according to the average value corresponding to each of the image regions, the maximum value corresponding to each of the image regions, and the average value corresponding to the image to be displayed.

14. The electronic device according to claim 13, wherein the processor is configured to:

calculate a weighted sum of the average value corresponding to each of the image regions, the maximum value corresponding to each of the image regions, and the average value corresponding to the image to be displayed to obtain the target luminance value corresponding to each of the backlight regions.

15. The electronic device according to claim 13, wherein the processor is configured to:

determine a red value, a green value, and a blue value of each of the pixel points of each of the image regions; and determine an average value of the red value, the green value, and the blue value of each of the pixel points of each of the image regions as the grayscale value of each of the pixel points of each of the image regions.

16. The electronic device according to claim 13, wherein the processor is configured to:

determine a red value, a green value, and a blue value of each of the pixel points of each of the image regions; and determine a maximum value of the red value, the green value, and the blue value of each of the pixel points of each of the image regions as the grayscale value of each of the pixel points of each of the image regions.

17. The electronic device according to claim 12, wherein the processor is configured to:

determine a target luminance value corresponding to each of the backlight regions according to the image to be displayed;

determine a backlight region having a target luminance value greater than or equal to a preset luminance value among the plurality of backlight regions as the first type backlight region; and determine a backlight region having a target luminance value less than the preset luminance value among the plurality of backlight regions as the second type backlight region.

* * * * *